(12) United States Patent  (10) Patent No.: US 8,332,420 B2
Kaiser  (45) Date of Patent: Dec. 11, 2012

(54) SYSTEM AND METHOD FOR PERFORMING A DATABASE QUERY

(75) Inventor: Reiner K. Kaiser, Redondo Beach, CA (US)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 238 days.

(21) Appl. No.: 12/690,180

(22) Filed: Jan. 20, 2010

(65) Prior Publication Data

US 2011/0179059 A1     Jul. 21, 2011

(51) Int. Cl.
*G06F 17/30*    (2006.01)
(52) U.S. Cl. ...................................................... 707/759
(58) Field of Classification Search .......... 707/759–765, 707/999.104–999.106
See application file for complete search history.

(56) References Cited

U.S. PATENT DOCUMENTS

| | | | |
|---|---|---|---|
| 5,717,902 A | 2/1998 | D'Souza et al. | |
| 5,873,075 A | 2/1999 | Cochrane et al. | |
| 6,101,507 A | 8/2000 | Cane et al. | |
| 6,397,125 B1 | 5/2002 | Goldring et al. | |
| 7,136,843 B2 * | 11/2006 | Bigus et al. | 706/52 |
| 7,343,364 B2 * | 3/2008 | Bram et al. | 706/47 |
| 7,412,432 B2 * | 8/2008 | Kaminsky et al. | 706/47 |
| 7,493,344 B2 | 2/2009 | Wald et al. | |
| 7,496,573 B2 * | 2/2009 | Westendorf | 1/1 |
| 7,526,468 B2 * | 4/2009 | Vincent et al. | 1/1 |
| 7,680,818 B1 * | 3/2010 | Fan et al. | 707/999.103 |
| 7,685,183 B2 | 3/2010 | Pace et al. | |
| 7,844,561 B2 * | 11/2010 | Kaminsky et al. | 706/47 |
| 2002/0165724 A1 | 11/2002 | Blankesteijn | |
| 2003/0120902 A1 | 6/2003 | Kottapali et al. | |
| 2003/0212681 A1 | 11/2003 | Kasper | |
| 2004/0250258 A1 * | 12/2004 | Raghuvir et al. | 719/315 |
| 2006/0143227 A1 * | 6/2006 | Helm et al. | 707/103 Y |
| 2006/0161894 A1 | 7/2006 | Oustiougov et al. | |
| 2010/0017395 A1 * | 1/2010 | Wayn et al. | 707/5 |
| 2010/0274759 A1 | 10/2010 | Takeuchi et al. | |
| 2011/0167037 A1 * | 7/2011 | Kaiser | 707/610 |
| 2011/0178998 A1 | 7/2011 | Nizami et al. | |

* cited by examiner

*Primary Examiner* — Debbie Le

(57) ABSTRACT

A system, method, and computer program product for efficient bulk database queries. A method includes receiving a closure rule and at least one input object, where the closure rule having at least one closure rule clause. The method also includes identifying a first closure rule clause to be evaluated for the input object, and constructing a recursive database query corresponding to the first closure rule clause. The method includes querying a database using the recursive database query, and receiving and storing results from the recursive database query in the data processing system.

18 Claims, 4 Drawing Sheets

SYSTEM AND METHOD FOR PERFORMING A DATABASE QUERY

CROSS-REFERENCE TO OTHER APPLICATION

The present application has some Figures or specification text in common with, but is not necessarily otherwise related to, U.S. patent application Ser. No. 12/690,188 for "System and Method for Data Management", filed concurrently herewith, that is hereby incorporated by reference.

TECHNICAL FIELD

The present disclosure is directed, in general, to data retrieval systems and methods, such as retrieval of very complex product lifecycle (PL) data.

BACKGROUND OF THE DISCLOSURE

PL data can be very complex with many referencers, dependencies, and a large number of different classes that have to be traversed and processed in order to collect all data required for a successful consolidation effort or any other data transfer approach.

SUMMARY OF THE DISCLOSURE

Various disclosed embodiments include a system, method, and computer program product for efficient bulk database queries. A method includes receiving a closure rule and at least one input object, where the closure rule having at least one closure rule clause. The method also includes identifying a first closure rule clause to be evaluated for the input object, and constructing a recursive database query corresponding to the first closure rule clause. The method includes querying a database using the recursive database query, and receiving and storing results from the recursive database query in the data processing system.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Many forms of data, such as product lifecycle (PL) datam can be very complex with many referencers, dependencies, and a large number of different classes that have to be traversed and processed in order to collect all data required for a successful consolidation effort or any other data transfer approach. Currently existing algorithms require application-level codeful logic and multiple database trips per object in order to correctly gather such data. Embodiments disclosed herein include systems and methods for high speed bulk data traversal and processing while minimizing the required number of database trips and therefore maximizing performance and throughput, without requiring application-level codeful logic.

Disclosed embodiments satisfy a demand for time-critical site consolidation solutions that address current wide-area network (WAN) performance, including 4-tier setups for a large number of remote users (one database per continent). Disclosed embodiments enable site consolidation solutions that can process very large datasets in the shortest possible time, with the smallest possible number of individual queries in order to minimize impact on normal business operations.

Figure 1:
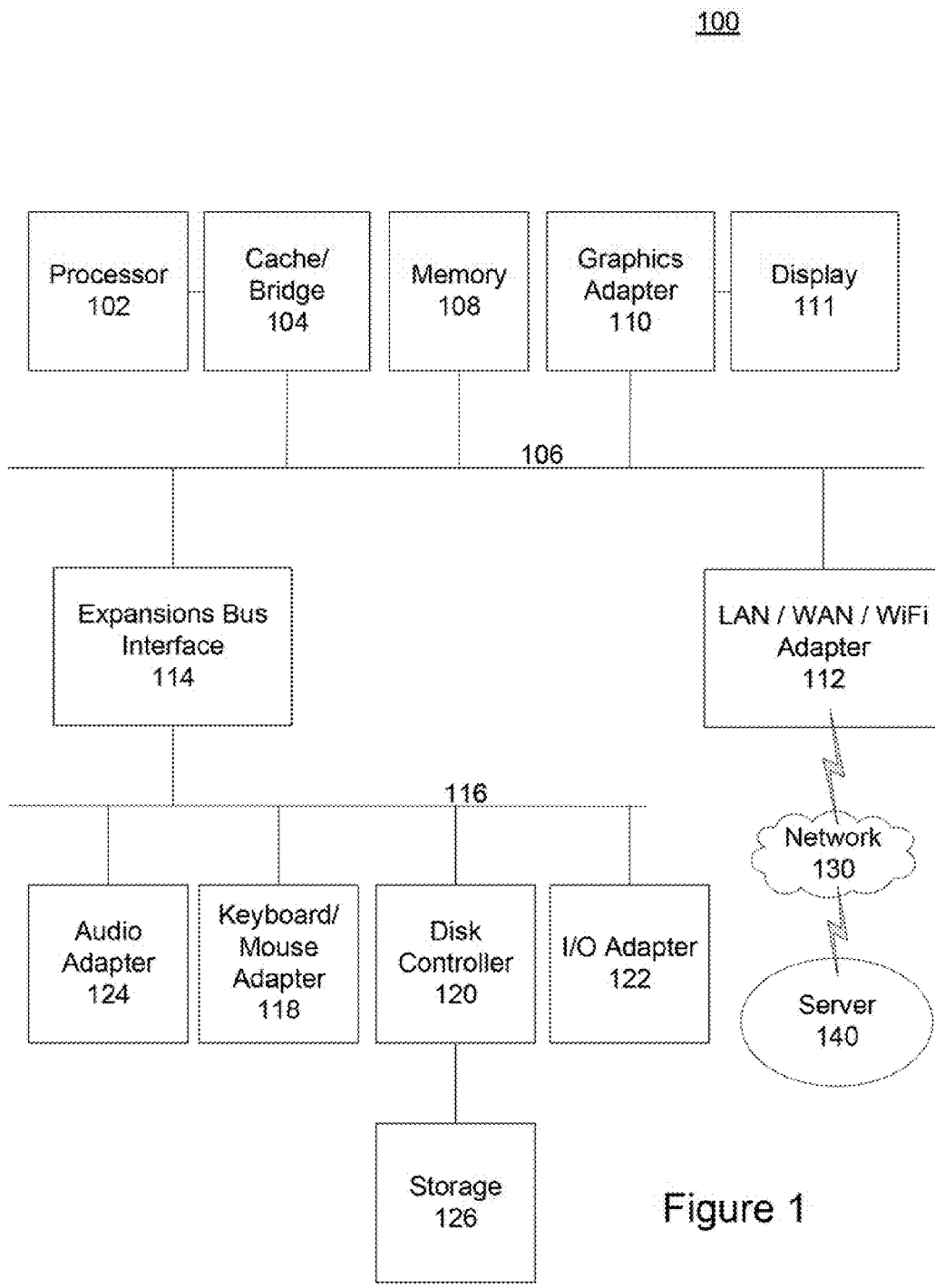
FIG. 1 depicts a block diagram of a data processing system in which an embodiment can be implemented.

FIG. 1 depicts a block diagram of a data processing system in which an embodiment can be implemented, for example as a server system providing database processing and lookups. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EE-PROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

In various embodiments, the processes performed herein can be executed by one or more data processing systems 100, and in particular, various steps may operate on one data processing system 100 to access data stored on a local or remote server system 140 over network 130.

Various embodiments include a process that maps clauses from a closure rule based formalism into a set of bulk SQL queries which are executed recursively with ever increasing input lists to generate all objects for a fully traversed structure in a PL system. The set of closure rules for product data traversal and dependencies describes for each object instance, which other object instances have to be processed, traversed or both. An example of such a rule is:

---
CLASS.Class_a : CLASS.Class_b : ATTRIBUTE.refxyz : PROCESS+TRAVERSE : $option_x=true
---

This rule defines that whenever an object instance of Class Class_a is encountered during traversal, the system must also process and traverse an object referenced via the Attribute reference refxyz if the secondary object is of class Class_b. The complete set of closure rule clauses of this nature designates a codeless way of formulating object model dependencies of structured data, for the purpose of consistent processing and traversal. This traversal is recursive, however the corresponding directed graph is typically tree-shaped (i.e. minimal/no closed loops).

Figure 2:
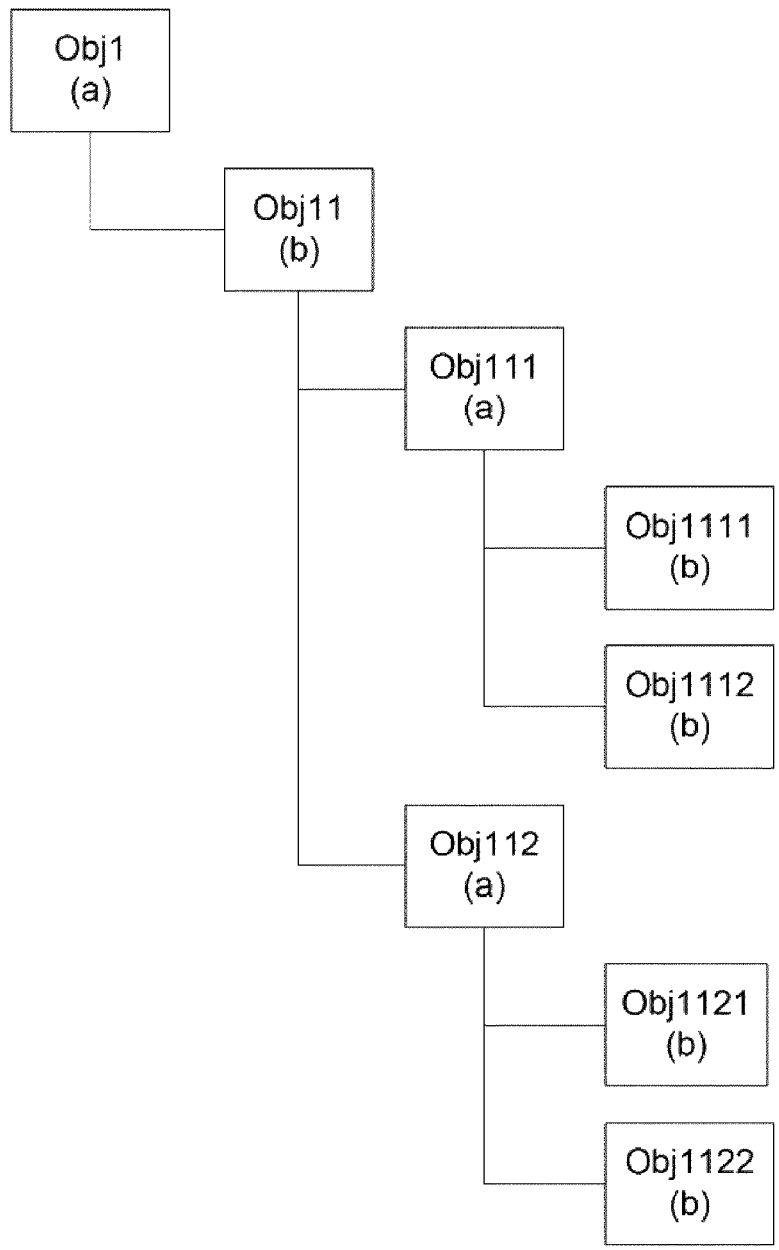
FIG. 2 shows an example of a directed graph in accordance with disclosed embodiments.

FIG. 2 shows an example of a directed graph in accordance with disclosed embodiments. In this example, the structure of FIG. 2 is a tree structure of PL data, where objects indicated as (a) are a Class_a instance, and objects indicated as (b) are a Class_b instance.

As can be seen in the example of FIG. 2, it is often the case in PL data and other data that Class_a instances reference Class_b instances which in turn again reference Class_a instances. A typical example for such behavior in a PL system could be a assembly structure where child assembly components are referenced by object model belonging to higher level assemblies.

According to disclosed embodiments, the system can combine all objects of same class or subclass obtained from a certain state of execution of the traversal, then execute a bulk SQL query corresponding to the applicable closure rules (e.g., closure rule clauses having Class_a as primary object).

The number of processed objects increases exponentially with each round of processing, as illustrated in the example of FIG. 2, where the number of objects increases in subsequent rounds from 1, 1, 2, 4, etc. objects. In this process, the actual number of queries is minimized and the corresponding query performance maximized.

The example rule above would translate to the following SQL query: (note Class instances correspond to table rows in an SQL database)

---
SELECT t1.object_id, t2.object_id FROM CLASS_A t1, CLASS_B t2 WHERE t1.refxyz = t2.object_id AND t1.object_id IN <inlist>
---

Note that multiple queries may apply to a given Class and multiple Classes may apply to a given query since a "CLASS" closure rule clause also applies to any subclass of a given Class. Also note that once an object has been processed by a certain closure rule, it no longer has to be collected as part of the in-list for the same closure rule ever again.

According to disclosed embodiments, complex object model dependencies which are captured in closure rules are efficiently translated into a set of queries. Very high throughput and bulking of object model retrieval queries is achieved by this approach.

The closure rule is the primary way to control the scope of the translation and is generally the place where the traversal process uses the most processing time.

Closure rules are composed of Closure Rule Clauses. In an exemplary implementations, each closure rule clause is composed of 5 parts: a Primary Object Selector (CLASS/TYPE.name), a Secondary Object Selector (CLASS/TYPE.name), a Relationship Selector (Relation keyword.name), a Directive, and a Conditional Clause. The Conditional Clause may be omitted. A single closure rule can be composed of many clauses, in various embodiments, and application or other processing of a closure rule that includes multiple clauses preferably includes processing of each of the closure rule's multiple clauses.

The relationship selector has a leading keyword:
[ATTRIBUTE|RELATIONP2S|RELATIONS2P|REFBY]
The Directive is one of
[PROCESS|TRAVERSE|SKIP]
The Conditional Clause, if it exists, it is used to qualify the closure rule clause.

The closure rule clause is not used if the conditional clause is not evaluated to true. The conditional clause is of the form
([!] [(] term1 [==|!=] term2 [)] [&&|||])*

The SKIP directive is useful to eliminate special cases before a more general rule is reached.

For example, a BomLine structure defines some part of an assembly Bill of Materials (BOM) in a PL system. Using the disclosed embodiments, the system can get, from a BomLine, all occurrence notes except manufacturing notes using a couplet such as:

```
TYPE.BOMLine:TYPE.MfgNote.PROPERTY.bl_all_notes:SKIP
TYPE.BOMLine:TYPE.*:PROPERTY.bl_all_notes:PROCESS
```

The bl_all_notes property points only to notes, and the relaxed secondary condition of the second line allows all note types to be picked up. Because the clauses are ordered, the MfgNotes are skipped.

One form of a query according to disclosed embodiments is:
CLASS.*:CLASS.*:PROPERTY.*:Traverse_and_Process Closure Rules define dependent object traversal. For a given Object, the system determines which objects are included to ensure consistent "island of data". The following is an example of an ItemRevision:

```
CLASS.ItemRevision:CLASS.Dataset:PROPERTY.IMAN_specification:TRAVERSE_AND_PROCESS
CLASS.ItemRevision:CLASS.Dataset:PROPERTY.IMAN_Rendering:TRAVERSE_AND_PROCESS
CLASS. ItemRevision: CLASS.Item:PROPERTY.items_tag:TRAVERSE_AND_PROCESS
CLASS.ItemRevision:CLASS.VariantExpressionBlock:PROPERTY.variant_expression_block:TRAVERSE
CLASS.VariantExpressionBlock:CLASS.VariantExpression:PROPERTY.expressions:TRAV+PROC
CLASS.VariantRevision:CLASS.Variant:PROPERTY.parent_variant:TRAVERSE_AND_PROCESS
CLASS.* : CLASS.icm0 : PROPERTY.IMAN_classification : TRAVERSE_AND_PROCESS
CLASS.icm0 : CLASS.smlb0: PROPERTY.ICSUserClass : TRAVERSE_AND_ PROCESS
```

Using closure rules in accordance with disclosed embodiments allows an elegant, efficient and customizable approach to dependent object traversal, and can be used in a variety of systems that make complex data accesses. While the examples used herein are particularly drawn to PL and other computer-aided design, manufacturing, and visualization systems, the techniques can be used in any number of systems and areas.

The bulk traverse techniques disclosed herein include bulk queries for traversal logic. This produces a list of end items (primary objects for island of data traversal). The systems and methods described can translate closure rules into recursive bulk queries, and group resulting objects into logically consistent "islands of data".

Various systems can use accountability tables to execute bulk queries and traversal against both source and target databases and maintain temporary tables (uid lists) of traversed objects. These help keep track of objects to transfer, enable fast island traversal at target site (fast import), and facilitate Accountability by comparing source and target temp table. Such fast synchronization takes source and target lists into account.

Figure 3:
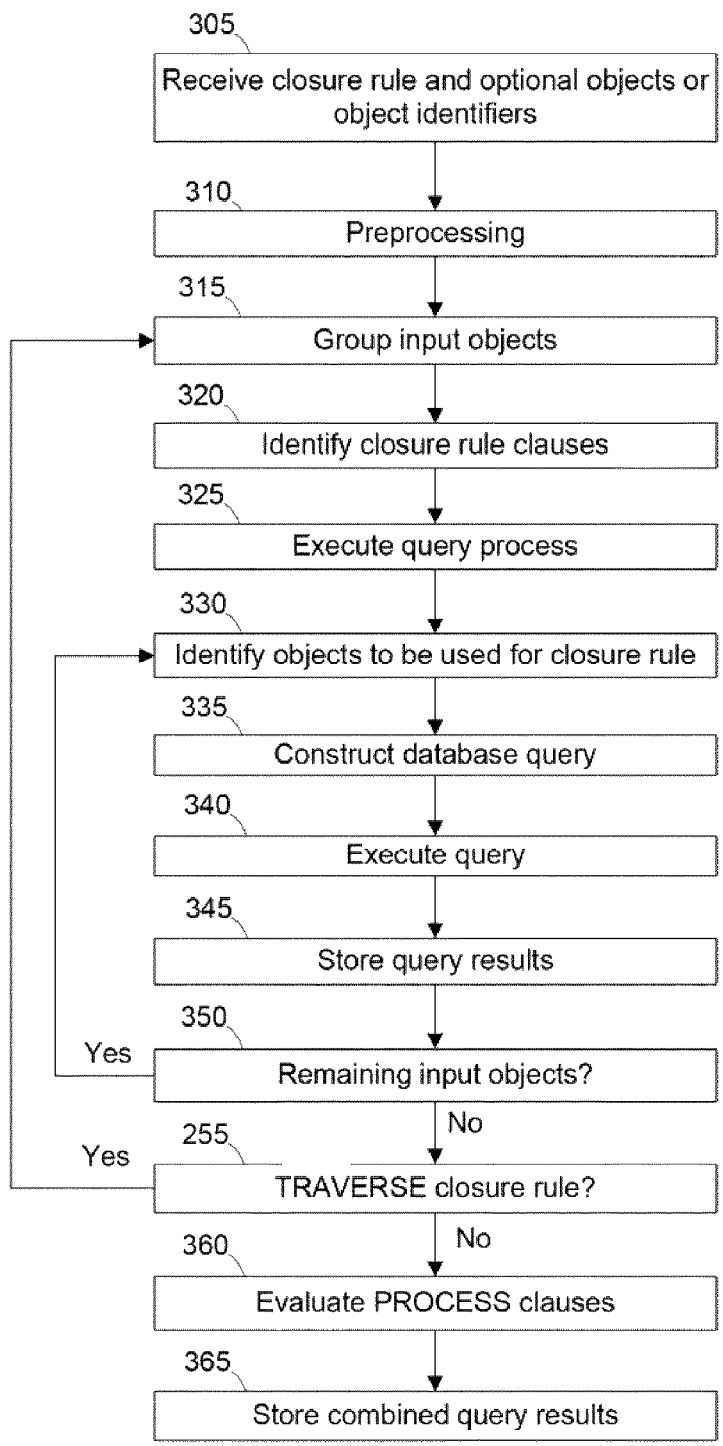
FIGS. 3 and 4 depict a flowcharts of a processes in accordance with disclosed embodiments.

FIG. 3 depicts a flowchart of a process in accordance with disclosed embodiments.

The system receives a closure rule, and can optionally also receive one or more input objects or object identifiers (step 305). Since an input object identifier is used to identify the specific input object, these terms may be used interchangeably. Receiving, as used herein, can include being received from another system or application, loaded from storage, received by a user, or otherwise received/loaded in a manner known to those of skill in the art.

The system can optionally perform preprocessing functions (step 310). This can include caching any data or data mapping tables that may be required, identifying the classes of any input object identifiers, converting data types to appropriate classes, separating PROCESS-only clauses for separate processing, and other preparatory processes.

The system can optionally group the input objects according to class (step 315).

The system identifies the closure rule clauses to be evaluated for each input object or input object group such as type or class (step 320).

For each input object or input object group and its closure rule clauses, the system executes a query process (step 325), described below.

The system identifies the objects or object identifiers to be applied to the closure rule or closure rule clause (step 330). The system can use this to block the same objects from being used for the closure rule more than once, and helps avoid looping.

The system constructs a recursive database query that corresponds to the closure rule or clause (step 335), such as an SQL enquiry. One process that can be used for this step is described below with relation to the flowchart of FIG. 4. This process will also address any conditional clauses in the closure rule. The recursive database query performs a bulk query corresponding to the input object and a plurality of other objects that are relationally dependent on the input object, to perform a bulk retrieval of the entire island of data.

The system executes the query on the objects or object identifiers from the filter process or step 330 (step 340). This step can include making the appropriate database query to a local or remote database.

The system receives, stores, and optionally processes the enquiry results (step 345). This can include filtering any secondaries to remove any entries on a SKIP list, and creating any data structures that help assignment of predecessor object identifiers or island-of-data identifiers for the traversed objects.

If there are remaining input objects or input object groups (step 350), the process repeats to step 330.

If the directive of the closure rule or closure rule clause is TRAVERSE (step 355), the system repeats the process to step 315, until all objects and their references have been traversed according to the closure rules.

The system can then evaluate all PROCESS-only clauses in a similar process to that of steps 325-350 (step 360), if they were separated above at preprocessing step 310.

The system then serializes and stores the combined enquiry results from each step 345 (step 365), such as in an XML or other suitable data structure, and can transmit this structure to a client system.

Figure 4:
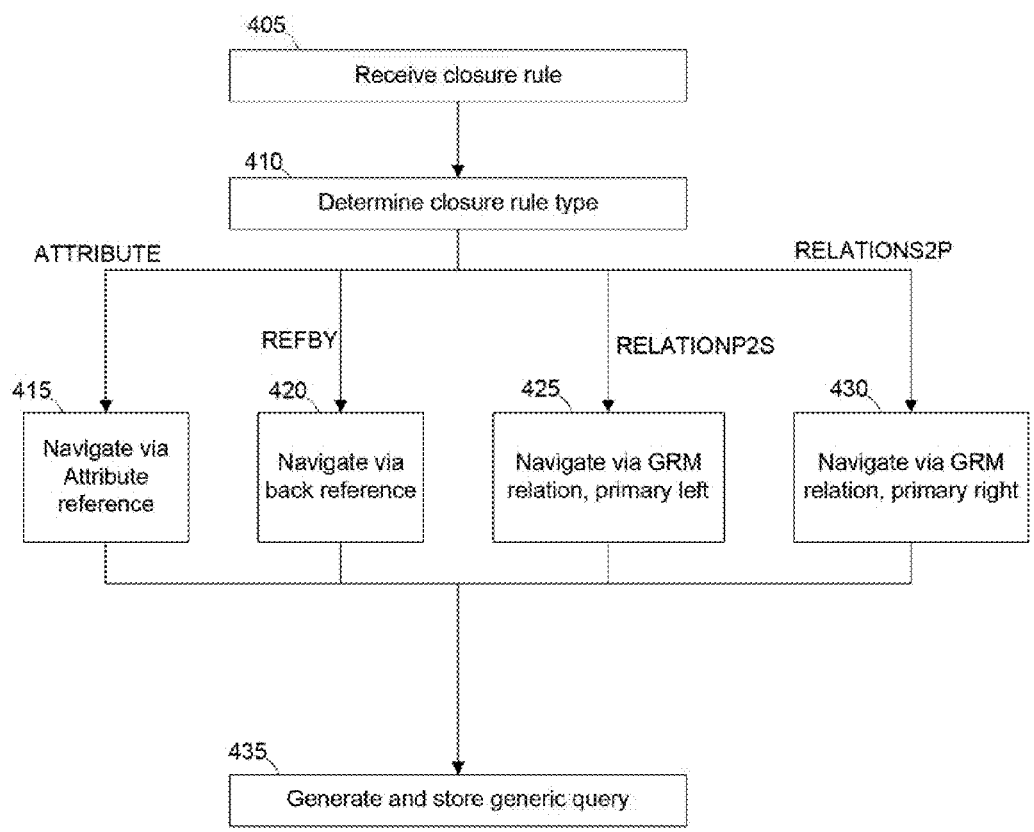

FIG. 4 depicts a flowchart of a process in accordance with disclosed embodiments.

The process of FIG. 4 allows query optimization by minimizing joins, avoids object loading, and bypasses property layers. In some embodiments, clauses containing properties are pre-screened and mapped to attributes where possible. This can include pre-screening of type Clauses and join against specific object identifiers, keeping track of already processed Objects, and using inlists to handle larger input object sets, in some cases up to and exceeding 64,000 objects.

FIG. 4 depicts a process in accordance with disclosed embodiments that is particularly useful for fast traversal execution.

The system receives the closure rule to be converted to an enquiry (step 405).

The system determines the closure rule type (step 410).

If the closure rule relationship type is ATTRIBUTE, the system sets a query to navigate from a primary to a secondary object via a reference in an Attribute on the primary (step 415). For example, if an Item instance has a Attribute "item_revs" that contains a VLA (variable length array) of ItemRevision Objects it is referencing, the secondaries would be the list of ItemRevs. In some embodiments, using an SQL query, the system can use a query such as:

```
Set select Clause: primary.Attribute,
    primary.puid, pom_object.pid;
inClause: primary.puid in primary_puid_list
orderClause: primary.Puid
``` where puid indicates the object identifier, and PID indicates the class identifier.

If the closure rule relationship type is REFBY, the system sets the query to navigate from primary to secondary via a "back reference" on the secondary object (step 420). For example, gather all secondary object PSOccurrences which have a back reference to the primary BVR object. In some embodiments, using an SQL query, the system can use a query such as:

```
Set select Clause: secondary.puide,
    Secondary, Attribute, pom_object.pid;
inClause: secondary.attribute in
    primary_puid_list and
orderClause: secondary.attribute;
```

If the closure rule relationship type is RELATIONP2S, the system sets the query to navigate to secondary object via a GRM relation, where the GRM "left side" or "primary" reference is pointing to the primary and the "right" is pointing to the secondary (step 425). In some embodiments, using an SQL query, the system can use a query such as:

```
Set selectClause: secondary.puid, primary.puid,
    imanrelation.puid , pom_object.pid ; ,opClause:
    imanrelation.relation_type="tag of rel";
joinClause: secondary.puid = imanrelation.secobj
    and primary.puid = imanrelation.priobj ;
inClause: primary.puit in primary_puid_list and
orderClause: primary.puid
```

If the closure rule relationship type is RELATIONS2P, the system sets the query to navigate to secondary object via a GRM relation, where the GRM "Right side" or "secondary" reference is pointing to the primary and the "left" is pointing to the secondary (step 430). In some embodiments, using an SQL query, the system can use a query such as:

```
Set selectClause: secondary.puid, .
    primary.puid, imanrelation.puid,
    pom_object.pid ; ,opClause:
    imanrelation.relation_type="tag of rel";
joinClause: primary.puid =
    imanrelation.secobj and secondary.puid =
    imanrelation.priobj ; inClause: primary.puit in
    primary_puid_list and orderClause:
    primary.puid
```

Of course, the specific rule types, names, and query examples used above are only to illustrate an exemplary implementations, and do not limit the disclosed embodiments. Other types, names, and coding can be used to accomplish similar functions, within the ability of one of ordinary skill in the art in light of this disclosure.

From queries generated in steps 415-430, the system generates and stores a generic query corresponding to the closure rule (step 435). This generic query is a data-specific query, not an instance-specific query. The query output (which can then be used in the process of FIG. 3) can be an SQL query or other database query as known to those of skill in the art. The generic query can then be used with any input object corresponding to the relevant closure rule to perform a recursive database query for the primary object and any other related objects defined by the closure rules.

The process of FIG. 4 can achieve query optimization by minimizing joins, avoiding object loading, and bypassing property layers. Clauses containing properties can be pre-screened and mapped to attributes.

Various embodiments can be implemented using well known industry standards including the SQL structured query language and XML 1.0 extensible markup language. In other embodiments, different or customized query-style languages can be used, either natively or interpreted and converted into the SQL language.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of a instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method for performing a database query by a data processing system, comprising:
   receiving a closure rule and at least one input object in the data processing system, the closure rule having at least one closure rule clause to collect data required for a consolidation as a logically consistent set of data objects, the at least one input object in a primary class of objects to be included in the consolidation;
   identifying a first closure rule clause by the data processing system, from the at least one closure rule clause, to be evaluated for the at least one input object;
   constructing a recursive database query corresponding to the first closure rule clause by the data processing system;
   querying a database using the recursive database query by the data processing system, wherein querying the database further comprises in response to encountering a first object of the primary class of objects, processing and traversing, according to the closure rule, a second object referenced by the first object even when the second object is in a secondary class of objects; and
   receiving and storing results from the recursive database query as the logically consistent set of data objects for the consolidation in the data processing system.

2. The method of claim 1, wherein the data processing system receives a plurality of input objects and groups the plurality of input objects by class.

3. The method of claim 1 further comprising:
   transmitting the logically consistent set of data objects to a second data processing system.

4. The method of claim 1, wherein the data processing system identifies a plurality of closure rule clauses to be evaluated for the at least one input object.

5. The method of claim 1, wherein the recursive database query performs a bulk query corresponding to the at least one input object and a plurality of other objects that are relationally dependent on the at least one input object.

6. The method of claim 1, wherein the data processing system receives a plurality of input objects, and when the closure rule includes a TRAVERSE requirement, performs the constructing and querying steps for each of the plurality of input objects until all of the plurality of input objects and any other objects referenced by the plurality of input objects have been traversed according to the closure rule.

7. A data processing system comprising a processor and accessible memory, the data processing system particularly configured to perform the steps of:
   receiving a closure rule and at least one input object, the closure rule having at least one closure rule clause to collect data required for a consolidation as a logically consistent set of data objects, the at least one input object is in a primary class of objects to be included in the consolidation;
   identifying a first closure rule clause from the at least one closure rule clause to be evaluated for the at least one input object;
   constructing a recursive database query corresponding to the first closure rule clause;
   querying a database using the recursive database query, wherein to query the database the data processing system is further configured to, in response to encountering a first object of the primary class of objects, process and traverse, according to the closure rule, a second object referenced by the first object even when the second object is in a secondary class of objects; and
   receiving and storing results from the recursive database query as the logically consistent set of data objects for the consolidation.

8. The data processing system of claim 7, wherein the data processing system is further configured to receive a plurality of input objects and group the plurality of input objects by class.

9. The data processing system of claim 7, wherein the data processing system is further configured to transmit the logically consistent set of data objects to a second data processing system.

10. The data processing system of claim 7, wherein the data processing system is further configured to identify a plurality of closure rule clauses to be evaluated for the at least one input object.

11. The data processing system of claim 7, wherein the data processing system is further configured to construct the recursive database query to perform a bulk query corresponding to the at least one input object and a plurality of other objects that are relationally dependent on the at least one input object.

12. The data processing system of claim 7, wherein the data processing system is further configured to receive a plurality of input objects, and when the closure rule includes a TRAVERSE requirement, perform the constructing and querying steps for each of the plurality of input objects until all of the plurality of input objects and any other objects referenced by the plurality of input objects have been traversed according to the closure rule.

13. A non-transitory computer-readable storage medium encoded with computer-executable instructions that, when executed, cause a data processing system to perform the steps of:

receiving a closure rule and at least one input object, the closure rule having at least one closure rule clause to collect data required for a consolidation as a logically consistent set of data objects, the at least one input object is in a primary class of objects to be included in the consolidation;

identifying a first closure rule clause from the at least one closure rule clause to be evaluated for the at least one input object;

constructing a recursive database query corresponding to the first closure rule clause;

querying a database using the recursive database query, wherein the instructions that cause the data processing system to query the database further include instructions that cause the data processing system to, in response to encountering a first object of the primary class of objects, process and traverse, according to the closure rule, a second object referenced by the first object even when the second object is in a secondary class of objects; and receiving and storing results from the recursive database query.

14. The computer-readable storage medium of claim 13, further including instructions causing the data processing system to receive a plurality of input objects and group the plurality of input objects by class.

15. The computer-readable storage medium of claim 13, further including instructions causing the data processing system to transmit the logically consistent set of data objects to a second data processing system.

16. The computer-readable storage medium of claim 13, further including instructions causing the data processing system to identify a plurality of closure rule clauses to be evaluated for the at least one input object.

17. The computer-readable storage medium of claim 13, wherein the recursive database query performs a bulk query corresponding to the at least one input object and a plurality of other objects that are relationally dependent on the at least one input object.

18. The computer-readable storage medium of claim 13, further including instructions causing the data processing system to receive a plurality of input objects, and when the closure rule includes a TRAVERSE requirement, perform the constructing and querying steps for each of the plurality of input objects until all of the plurality of input objects and any other objects referenced by the plurality of input objects have been traversed according to the closure rule.

* * * * *